US 6,689,442 B2

(12) United States Patent
Nakamura et al.

(10) Patent No.: US 6,689,442 B2
(45) Date of Patent: Feb. 10, 2004

(54) RELEASING SHEET AND PROCESS FOR PRODUCING THE SAME

(75) Inventors: Toru Nakamura, Saitama (JP); Tomishi Shibano, Saitama (JP)

(73) Assignee: Lintec Corporation, Tokyo (JP)

( * ) Notice: Subject to any disclaimer, the term of this patent is extended or adjusted under 35 U.S.C. 154(b) by 114 days.

(21) Appl. No.: 09/926,222

(22) PCT Filed: Jan. 16, 2001

(86) PCT No.: PCT/JP01/00229

§ 371 (c)(1),
(2), (4) Date: Sep. 26, 2001

(87) PCT Pub. No.: WO01/54901

PCT Pub. Date: Aug. 2, 2001

(65) Prior Publication Data

US 2002/0187357 A1 Dec. 12, 2002

(30) Foreign Application Priority Data

Jan. 28, 2000 (JP) .......................................... 2000-19776

(51) Int. Cl.[7] .............................. B32B 25/20; C08F 2/48; C08J 7/18
(52) U.S. Cl. ..................... 428/41.4; 428/41.8; 428/447; 427/508; 427/515; 427/516; 427/519
(58) Field of Search .............................. 428/41.4, 41.8, 428/447; 427/508, 515, 516, 519

(56) References Cited

U.S. PATENT DOCUMENTS

| | | | | |
|---|---|---|---|---|
| 3,726,710 A | * | 4/1973 | Berger et al. ................ | 428/447 |
| 4,064,027 A | * | 12/1977 | Gant .......................... | 522/172 |
| 4,603,168 A | * | 7/1986 | Sasaki et al. ................. | 522/18 |
| 4,684,670 A | * | 8/1987 | Eckberg et al. ................ | 522/13 |
| 4,707,503 A | * | 11/1987 | Itoh et al. ..................... | 522/99 |
| 5,328,941 A | * | 7/1994 | Hayashi et al. ............... | 522/33 |

FOREIGN PATENT DOCUMENTS

| | | |
|---|---|---|
| JP | 5-222699 | 8/1993 |
| JP | 9-248888 | 9/1997 |
| JP | 9-256299 | 9/1997 |

OTHER PUBLICATIONS

Machine translation of JP 09–248888, Sep. 1997 obtained from JPO web–site.*

* cited by examiner

Primary Examiner—Jeffrey B. Robertson
(74) Attorney, Agent, or Firm—Oblon, Spivak, McClelland, Maier & Neustadt, P.C.

(57) ABSTRACT

There are disclosed a releasing sheet which comprises a sheet like substrate and a cured layer placed thereon of an addition reaction type silicone composition containing a photosensitizer, characterized in that the cured layer is formed by heat treating a layer of an addition reaction type silicone composition containing at least one photosensitizer selected from the group consisting of α-hydroxy ketones (e.g. 2-hydroxy-2-methyl-1-phenylpropane-1-one, 1-[4-(2-hydroxyethoxy)-phenyl]-2-hydroxy-2-methylpropane-1-one and 1-hydroxycyclohexy-phenyl-ketone) and α-diketone dialkyl acetals (e.g. benzyldimethyl acetal), followed by treatment with ultraviolet ray irradiation; and a process for efficiently producing the releasing sheet in extremely high productivity. The layer of an addition reaction type silicone composition has favorable adhesiveness to the substrate and non-migration property, and thus the objective releasing sheet has excellent releasability and exceptionally high flatness.

4 Claims, No Drawings

RELEASING SHEET AND PROCESS FOR PRODUCING THE SAME

TECHNICAL FIELD

The present invention relates to a releasing sheet and a process for producing the same. More particularly, it is concerned with a releasing sheet in which a cured layer of a silicone has favorable adhesiveness to a substrate and non-migration property; which has excellent releasability and high flatness never can be realized by any of conventional sheets; and which is used in labels and pressure sensitive adhesive tapes and is useful as a casting film for producing a ceramic green sheet. Furthermore, the present invention pertains to a process for efficiently producing the above-mentioned releasing sheet.

BACKGROUND ART

A releasing sheet comprises a substrate such as paper, a plastics film and a polyethylene laminated paper sheet, and a release treated layer which is placed thereon and is formed by coating at least one side of the substrate with a silicone as a releasing agent, followed by curing the resin. Such a releasing sheet is used as a tacky label, a carrier sheet at the time of producing a resin sheet, a protective sheet therefor, a casting film for forming a film of a ceramic green sheet, etc.

The performances required of the above-mentioned releasing sheet which is subjected to such purpose of use include for instance, moderate releasability, non-migration property of silicone, stability with the lapse of time, high flatness, moderate surface roughness, coatability at the time of film forming from a resin, pressure sensitive adhesive, ceramic slurry, etc., and the like performances.

Examples of release treatment agents include a releasing agent composed of a silicone of heat curable addition reaction type, heat curable condensation type, room temperature curable type, ultraviolet ray curable type, electron beam curable type, and heat-and-ultraviolet ray curable type and the like, of which is mainly used a releasing agent composed of a heat curable addition reaction type silicone. However, in order to assure a stable cured film, the releasing agent composed of a heat curable addition reaction type silicone is obliged to be cured at a high temperature of usually 140° C. or higher. As a result, such problem is brought about that thermal shrinkage or wrinkle is more prone to be caused on a substrate, especially a substrate which is inferior in heat resistance, since heat is applied to the substrate in the release treatment step, thereby making it impossible to form a releasing sheet having high flatness.

Under such circumstances, in the case of conducting release treatment processing using a heat curable addition reaction type silicone for a film substrate or a paper sheet laminated with polyethylene on double sides each being inferior in heat resistance, an attempt is made to retard processing rate under a heating condition of a low temperature (110 to 130° C.) in order to suppress thermal shrinkage or wrinkle and polyethylene foaming to the utmost. However, such processing treatment brings about inevitably poor productivity, likelihood of insufficient curing and besides, the troublesome problems in non-migration property of silicone, release stability and the like.

In addition, a releasing agent composed of a silicone of any of heat curable condensation type and room temperature curable type is problematic in low rate of curing reaction and besides, inferior non-migration property of silicone and the like.

As compared with the foregoing, a releasing agent composed of a silicone of any of ultraviolet ray curable type and heat-and-ultraviolet ray curable type is useful as a releasing agent capable of solving the above-mentioned problems, and enables curing at a low temperature as well as a high processing rate. Nevertheless in the case of producing a releasing sheet by using any of the aforesaid releasing agent, further enhancement of productivity is desired. In order to further enhance the productivity in a releasing sheet using a conventional releasing agent composed of a silicone of heat-and-ultraviolet ray curable type, the release treatment processing must be carried out at a further high rate. For the sake of such a high rate, it is necessary to enhance the curability of the above-mentioned releasing agent composed of a silicone, whereby importance should be attached to the selection of a photosensitizer to be used therein.

DISCLOSURE OF THE INVENTION

In such circumstances, an object of the present invention is to provide a releasing sheet in which a cured layer of a silicone has favorable adhesiveness to a substrate and non-migration property; which has excellent releasability and high flatness never can be realized by any of conventional sheets; and which is extremely enhanced in productivity.

Other objects of the present invention will be obvious from the text of this specification hereinafter disclosed.

As a result of intensive extensive research and investigation accumulated by the present inventors in order to develop a a releasing sheet which has the aforestated excellent functions and is enhanced in productivity, the following findings and information were obtained.

A conventional releasing agent composed of a silicone of heat-and-ultraviolet ray curable type is produced by adding a photosensitizer to a releasing agent composed of a heat curable addition reaction type silicone resin, and curing the agent by heating treatment and ultraviolet ray irradiation. Therein, use is made of, as a photosensitizer, acetophenone, benzophenone, trimethylsilylbenzophenone, propiophenone, 3-methylacetophenone, 4-methylacetophenone, benzoin ethyl ether, a compound in which benzoin is bonded by ether linkage to both ends of dimethylpoly-siloxane, 4-allylacetophenone, 3-pentyl-acetophenone, 4-methoxy-benzophenone, α-aminoketone, triphenylamine, azobis (isobutyro-nitrile) and the like. It is known that by adding any of the above-exemplified photosensitizer, the curability is enhanced as compared with a conventional releasing agent composed of a heat curable addition reaction type silicone. However, further research and investigation were accumulated on photosensitizers by the present inventors, paying attention to the necessity of using a photosensitizer which is more useful for curing the silicone than the above-exemplified photosensitizer in order to carry out further low temperature and higher rate curing. As a result, it has been found that α-hydroxy ketones and α-diketone dialkyl acetals are effective in particular. The present invention has been accomplished by the above-mentioned findings and information.

That is to say, the present invention provides:

(1) a releasing sheet which comprises a sheet like substrate and a cured layer placed thereon of an addition reaction type silicone composition containing a photosensitizer, characterized in that said cured layer is formed by heat treating a layer of an addition reaction type silicone composition containing at least one photosensitizer selected from the group consisting of α-hydroxy ketones and α-diketone dialkyl acetals, followed by a treatment with ultraviolet ray irradiation.

(2) the releasing sheet as set forth in the preceding item (1), wherein the photosensitizer is at least one species selected from the group of α-hydroxy ketones consisting of 2-hydroxy-1-(4-isopropylphenyl)-2-methylpropane-1-one, 2-hydroxy-2-methyl-1-phenylpropane-1-one, 1-[4-(2-hydroxyethoxy)phenyl]-2-hydroxy-2-methylpropane-1-one and 1-hydroxycyclohexyphenyl ketone, and α-diketone dialkyl acetals consisting of benzyldimethyl acetal and benzyldiethyl acetal.

(3) the releasing sheet as set forth in the preceding item (1) or (2), wherein the addition reaction type silicone composition comprises 0.01 to 10 parts by weight of the photosensitizer based on 100 parts by weight of the total amount of an addition reaction type silicone and a crosslinking agent.

(4) the releasing sheet as set forth in the preceding item (1) or (2), wherein the addition reaction type silicone composition comprises polydimethylsiloxane having a vinyl group as a functional group.

(5) a process for the production of a releasing sheet which comprises the steps of equipping a sheet like substrate thereon with a layer of an addition reaction type silicone composition containing at least one photosensitizer selected from the group consisting of α-hydroxy ketones and α-diketone dialkyl acetals, thereafter heat treating the substrate equipped with said layer, and subsequently irradiating the same with ultraviolet ray to cure the layer of the silicone composition.

THE MOST PREFERRED EMBODIMENT TO CARRY OUT THE INVENTION

The releasing sheet according to the present invention comprises a sheet like substrate and a cured layer placed thereon of an addition reaction type silicone composition. The above-mentioned sheet like substrate is not specifically limited, but may be properly selected for use from any of the well known substrates which have heretofore been customarily used as a substrate in a releasing sheet. Examples of such sheet like substrates include paper substrates such as glassine paper, coat paper and cast coated paper, laminated paper comprising any of the foregoing paper substrates and a thermoplastic resin such as polyethylene laminated therewith, a polyester film made of polyethylene terephthalate, polyethylene naphthalate or the like, a polyolefin film made of polypropylene, polymethylpentene or the like, a polycarbonate film and polyvinyl acetate film.

The thickness of the sheet like substrate is not specifically limited, but may be properly selected according to the purpose of use, and it is in the range of usually 5 to 300 μm, preferably 10 to 200 μm.

The cured layer of the silicone composition to be installed on the above-mentioned sheet like substrate according to the present invention is obtained by curing a layer of an addition reaction type silicone composition containing the photosensitizer by the combinational use of a heat treatment and a ultraviolet ray irradiation treatment. The foregoing addition reaction type silicone composition comprises principal ingredients composed of an addition reaction type silicone and a crosslinking agent, a catalyst and a photosensitizer, and optionally as desired, a silicone having the function of modifying the releasing characteristic of the cured layer, an addition reaction inhibitor and an adhesion improver. The above-mentioned addition reaction type silicone is not specifically limited, but may be selected for use from a variety of the silicone, for instance, those that have heretofore been customarily used as a releasing agent composed of a heat curable addition reaction type silicone. The addition reaction type silicone is exemplified by at least one member selected from polyorganosiloxanes having an alkenyl group as a functional group in a molecule. Preferable examples of the above-mentioned polyorganosiloxanes having an alkenyl group as a functional group in a molecule include polydimethylsiloxane having a vinyl group as a functional group, polydimethylsiloxane having a hexenyl group as a functional group and the mixture of the two.

The above-mentioned crosslinking agent is exemplified by a silicone such as polyorganosiloxane having in its one molecule, at least two hydrogen atoms each bonded to a silicon atom, specifically by dimethylsiloxane/methylhydrogen-siloxane copolymer the end of which is hindered with dimethylhydrogen-siloxy group, dimethylsiloxane/methylhydrogen-siloxane copolymer the end of which is hindered with trimethylsiloxy group, poly (methylhydrogen-siloxane) the end of which is hindered with trimethylsiloxy group and poly (hydrogen silsequioxane). The amount of the exemplified crosslinking agent to be used is selected in the range of 0.1 to 100 parts by weight, preferably 0.3 to 50 parts by weight based on 100 parts by weight of the addition reaction type silicone.

There is usually employed as a catalyst, a platinum base compound, which is exemplified by platinum in fine powder form, platinum in fine powder form adsorbed on carbon powder carrier, chloroplatinic acid, an alcohol modified chloroplatinic acid, chloroplatinic acid/olefin complex, palladium catalyst and rhodium catalyst. The amount of the above-exemplified catalyst to be used is in the range of 1 to 1000 ppm, approximately based on the total amount of the addition reaction type silicone and the crosslinking agent.

On the one hand, as the photosensitizer to be added to the addition reaction type silicone composition, there is used in the present invention, α-hydroxy ketones and/or α-diketone dialkyl acetals.

The α-hydroxy ketones are preferably exemplified by 2-hydroxy-1-(4-isopropylphenyl)-2-methylpropane-1-one, 2-hydroxy-2-methyl-1-phenylpropane-1-one, 1-[4-(2-hydroxyethoxy)phenyl]-2-hydroxy-2-methylpropane-1-one and 1-hydroxycyclohexyphenyl ketone. In addition, the α-diketone dialkyl acetals are preferably exemplified by benzyldimethyl acetal (2, 2-dimethoxy-1, 2-diphenylethane-1-one) and benzyldiethyl acetal (2, 2-diethoxy-1, 2-diphenylethane-1-one) Any of the above-exemplified photosensitizers may be used alone or in combination with at least one other.

By using such α-hydroxy ketones and/or α-diketone dialkyl acetals as a photosensitizer, it is made possible to further enhance the low temperature curability and high rate curability, thereby greatly increasing release treatment processing rate. Moreover, the product is made thereby into a releasing sheet which is stabilized in releasability, minimized in migration property of silicone, free from thermal shrinkage and/or wrinkle of the substrate due to heating at the time of a release treatment, and has high flatness. Further in the case of using a polyethylene laminated sheet, the resultant releasing sheet is free from polyethylene foaming.

Depending upon the type of the photosensitizer, the amount thereof to be used, when being unreasonably small, brings about unlikelihood of sufficiently exhibit the working effect of the the present invention, whereas the amount thereof, when being unreasonably large, causes adverse influence on curability and performances of the releasing sheet to be obtained. Therefore, the amount thereof is selected in the range of usually 0.01 to 10 parts by weight, preferably 0.1 to 2.0 parts by weight based on 100 parts by weight of the total amount of the addition reaction type silicone and the crosslinking agent.

Examples of the silicone which has the function of modifying the releasing characteristic of the cured film include polyorganosiloxane not having an alkenyl group or hydrogen atom each bonded to a silicon atom in its one molecule, specifically, polydimethylsiloxane the end of which is hindered with trimethylsiloxy group and polydimethylsiloxane the end of which is hindered with dimethylphenylsiloxy group.

The aforesaid addition reaction inhibitor is a component used for the purpose of imparting the composition with shelf life stability at room temperature, and it is specifically exemplified by 3,5-dimethyl-1-hexyne-3-ol, 3-methyl-1-pentene-3-ol, 3-methyl-3-pentene-1-in, 3,5-dimethyl-3-hexene-1-in, cyclic tetravinylsiloxane and benzotriazole.

In the present invention, a coating solution having a viscosity which enables coating is prepared by adding, in a proper organic solvent, the addition reaction type silicone composition, the photosensitizer together with a variety of components to be used when desired each at a prescribed proportion. The organic solvent is not specifically limited, but may be selected for use from various solvents including for instance, hydrocarbons such as toluene, hexane and heptane, ethyl acetate, methyl ethyl ketone and a mixture thereof.

The coating solution thus prepared according to the present invention is applied to either or both sides of the aforesaid sheet like substrate by means of e.g. gravure coat method, bar coat method, spray coat method, spin coat method, etc. so as to install a layer of the addition reaction type silicone composition containing the photosensitizer. The thickness of the layer of the addition reaction type silicone composition is not specifically limited, but a coating amount expressed in terms of solid content is selected in the range of usually 0.01 to 3.0 g/m$^2$, preferably 0.01 to 1.5 g/m$^2$.

The sheet like substrate film equipped with the layer of the addition reaction type silicone composition according to the present invention is in the first place, heat treated at a temperature in the range of 40 to 120° C. to preliminarily cure the resultant layer of the addition reaction type silicone composition. The heating temperature, when being lower than 40° C., causes a fear of insufficiency in drying or preliminary curing, whereas the heating temperature, when being higher than 120° C., causes thermal shrinkage or wrinkle, thereby failing to attain the objects of the the present invention. Taking into consideration the drying, preliminary curing, thermal shrinkage or wrinkle and the like factors, the heating temperature is preferably in the range of 50 to 100° C.

The layer of the addition reaction type silicone composition which has been preliminarily cured by heat treatment is subjected to inline ultraviolet ray radiation to completely cure the layer. Usable ultraviolet lamps are available from previously well known lamps such as high pressure mercury vapor lamp, metal halide lamp, high power metal halide lamp, non-electrode ultraviolet lamp. Of these, non-electrode ultraviolet lamp is preferable from the viewpoints of less thermal damage to the sheet like substrate and favorable curability of the silicone composition layer due to suitable ultraviolet emission efficiency, infrared ray irradiation rate, etc. The foregoing lamp is available from D bulb, H bulb, H+bulb, V bulb and the like manufactured by Fusion Corporation, of which H bulb and H+bulb are particularly preferable. The ultraviolet irradiation output may be properly optionally selected, and is in the range of usually 30 W/cm to 600 W/cm, preferably 50 W/cm to 360 W/cm.

The temperature at the time of ultraviolet irradiation treatment, when being carried out inline, is not specifically limited, but may be either the temperature under heated condition immediately after the heating treatment or room temperature.

The above-mentioned production process enables to obtain at favorable productivity, the releasing sheet according to the present invention in which the cured layer of the addition reaction type silicone composition is formed on either or both sides of the sheet like substrate with favorable adhesiveness thereto, and which is free from thermal shrinkage or wrinkle, imparted with extremely high flatness and besides excellent in releasability.

In the following, the present invention will be described in more detail with reference to comparative examples and working examples, which however shall never limit the present invention thereto.

Evaluations were made of the various characteristics of each of the releasing sheets that were obtained through the working examples and comparative examples in accordance with the evaluation procedures as described hereunder.

(1) Curability

Curability was evaluated in accordance with the following criteria by the method comprising vigorously rubbing the surface of a cured coating on a releasing film ten times with fingers, and observing the smear and rub-off on the film.

⊚: no smear nor rub-off observed at all
○: slight smear observed (not causing practical problem)
Δ: some smear and rub-off observed (sometimes causing practical problem)
x: marked smear with considerable rub-off observed (causing practical problem)

(2) Peeling Force

The cured coating on a releasing film was coated with an acrylic pressure sensitive adhesive (manufactured by Toyo Ink Mfg. Co.,Ltd. under the trade name "BPS-5127") so as to attain a dry thickness of 40 μm, the resultant coated film was dried for 2 minutes in a hot air circulation type dryer at 100° C., and thereafter was laminated with a surface substrate (wood free paper) to prepare a specimen of a pressure sensitive adhesive sheet. The specimen was allowed to stand under the conditions of 23° C. and 65% R.H. for 24 hours, and cut into pieces having a width of 20 mm each. By the use of a tension testing instrument, the releasing film of the specimen was peeled off the laminate at an angle of 180 degrees at a velocity of 300 millimeter per minute to measure the force required for peeling so as to evaluate the peeling force.

(3) Non-migration Property of Silicone Resin

Non-migration property of silicone was evaluated in accordance with the following criteria by the method comprising laminating the cured coating on a releasing film with a poly-ethylene terephthalate (PET) film, applying a load of 1.97 N/mm$^2$ to the laminate thus formed, allowing the laminate to stand for 24 hours, thereafter peeling the PET film off the laminate, painting the laminated surface with a felt-tipped marker, and observing the extent of repelling to confirm whether silicone was present or not.

⊚: no migration observed at all
○: slight migration observed (not causing practical problem)

Δ: some migration observed sometimes causing practical problem)

x: considerable migration observed (causing practical problem)

(4) Flatness (Thermal Shrinkage or Wrinkle)

Flatness was evaluated in accordance with the following criteria by the method comprising visually observing wrinkle on a releasing film, and also coating the cured coating with a pressure sensitive adhesive in a thickness of 6 μm, and examining whether uniform coating was possible or not.

⊚: excellent

○: good (not causing practical problem)

Δ: somewhat inferior (sometimes causing practical problem)

x: inferior (causing practical problem)

(5) Adhesiveness of Cured Coating

Adhesiveness of cured coating was evaluated in accordance with the following criteria by the method comprising vigorously rubbing ten times with fingers, the surface of a cured coating on a releasing film, and observing the rub-off of the cured coating from the polyester film.

⊚: no rub-off observed at all

○: slight rub-off observed (not causing practical problem)

Δ: some rub-off observed (sometimes causing practical problem)

x: considerable rub-off observed (causing practical problem)

(6) Residual Adhesion Factor

The releasing film was laminated on the cured coating side with a pressure sensitive adhesive tape (manufactured by Nitto Denko Corporation under the trade name "31B Tape"), subjected to a load of $9.81 \times 10^{-8}$ N/mm$^2$, allowed to stand at 70° C. for 24 hours, and further allowed to stand under the conditions of 23° C. and 65% R.H. for 24 hours. Thereafter the adhesive tape was peeled off the releasing film, stuck to a stainless steel plate, and peeled off the stainless steel plate at an angle of 180 degrees at a velocity of 300 millimeter per minute to measure the force required for peeling. Thus an evaluation was made of residual adhesion factor by expressing in percentage the force required for peeling the untreated pressure sensitive adhesive tape off the stainless steel plate.

EXAMPLE 1

An addition reaction type silicone composition was prepared by adding 2 parts by weight of a platinum base catalyst (manufactured by Toray Dow Corning Silicone Corporation under the trade name "SRX-212") to 100 parts by weight of an addition reaction type silicone as a releasing agent (manufactured by Toray Dow Corning Silicone Corporation under the trade name "SRX-211") comprising as a principal ingredient, polydimethyl-siloxane having vinyl group as a functional group and a cross-linking agent (polymethylhydrogen siloxane). To 100 parts by weight of the above-mentioned principal ingredient was added 0.1 part by weight of benzyldimethyl acetal belonging to α-diketone dialkyl acetal as a photosensitizer. The mixture prepared in this way was diluted with an organic solvent comprising toluene as a principal ingredient to prepare a coating solution having a solid concentration of one % by weight.

The coating solution was uniformly applied through gravure coat method, to a biaxially oriented PET film having a thickness of 38 μm so as to form a coating thickness of 0.1 μm after drying (coating amount expressed in terms of solid content being 0.1 g/m$^2$). Subsequently the coated PET film was heat-treated for 20 seconds in a hot air circulation type dryer at 50° C., and immediately thereafter was irradiated with ultraviolet ray by the use of a conveyor type ultraviolet irradiating machine equipped with a fusion H bulb of 240W/cm in which a heat ray cut filter was high diffusion type at a conveyor r speed of 200 meter per minute. In this manner, the addition reaction type silicone releasing agent was cured to prepare a releasing film. Various characteristics of the resultant releasing film are given in Table 1.

EXAMPLE 2

The procedure in Example 1 was repeated to prepare a releasing film except that use was made of 1.0 part by weight of 1-hydroxycyclohexylphenyl ketone belonging to α-hydroxy ketones as a photosensitizer in place of benzyldimethyl acetal, and that the conveyor speed in meter per minute was altered from 200 to 100. Various characteristics of the resultant releasing film are given in Table 1.

EXAMPLE 3

The procedure in Example 1 was repeated to prepare a releasing film except that use was made of 0.2 part by weight of 1-[4-(2-hydroxyethoxy)phenyl]-2-hydroxy-2-methylpropane-1-one belonging to α-hydroxy ketones as a photosensitizer in place of benzyldimethyl acetal, and that the conveyor speed in meter per minute was altered from 200 to 120. Various characteristics of the resultant releasing film are given in Table 1.

EXAMPLE 4

The procedure in Example 1 was repeated to prepare a releasing film except that use was made of 0.2 part by weight of 2-hydroxy-2-methyl-1-phenylpropane-1-one belonging to α-hydroxy ketones as a photosensitizer in place of benzyldimethyl acetal, and that the conveyor speed in meter per minute was altered from 200 to 80. Various characteristics of the resultant releasing film are given in Table 1.

COMPARATIVE EXAMPLE 1

The procedure in Example 1 was repeated to prepare a releasing film except that use was made of 0.2 part by weight of 2-methyl-1-[4-(methylthio)phenyl]-2-morpolinopropane-1-one belonging to α-amino ketones as a photosensitizer in place of benzyldimethyl acetal, and that the conveyor speed in meter per minute was altered from 200 to 40. Various characteristics of the resultant releasing film are given in Table 1.

COMPARATIVE EXAMPLE 2

A coating solution having a solid concentration of one % by weight was prepared in the same manner as in Example 1 except that any photosensitizer was not added to the coating solution.

Thereafter, in the same manner as in Example 1, the coating solution thus prepared was applied to a biaxially oriented PET film, and subsequently the coated PET film was heat treated for 30 seconds in a hot air circulation type dryer at 110° C. Various characteristics of the resultant releasing film are given in Table 1.

TABLE 1

| | Cura-bility | Adhesive-ness of cured coating | Peeling force (mN/ 20 mm) | Non-migration property of silicone | Residual adhesion factor (%) | Flat-ness |
|---|---|---|---|---|---|---|
| Example 1 | ◎ | ◎ | 157 | ○ | 83.1 | ◎ |
| Example 2 | ◎ | ◎ | 127 | ◎ | 86.7 | ◎ |
| Example 3 | ◎ | ◎ | 137 | ○ | 86.5 | ◎ |
| Example 4 | ◎ | ◎ | 118 | ○ | 87.4 | ◎ |
| Comparative Example 1 | Δ | X | 216 | X | 85.5 | ◎ |
| Comparative Example 2 | Δ | Δ | 196 | X | 80.0 | Δ |

Industrial Applicability

In summarizing the working effect of the present invention, by installing on at least one side of a sheet like substrate, a cured layer of a silicone composition using as a releasing agent, an addition reaction type silicone containing the specific photosensitizer through combinational use of heating treatment and ultraviolet irradiation treatment, it is made possible to obtain in extremely high productivity, a releasing sheet in which the cured layer has favorable adhesiveness to the substrate; which is excellent in releasability; and which has high flatness never can be realized by any of conventional releasing sheet.

The releasing sheet according to the present invention is preferably employed as a tacky label, a tacky tape, a carrier sheet at the time of producing a resin sheet, a protective sheet therefor, a casting film for forming a film of a ceramic green sheet and the like.

What is claimed is:

1. A releasing sheet which comprises a sheet substrate and a cured layer placed thereon of an addition curable silicone composition, wherein said cured layer is formed by heat treating a layer of an addition curable silicone composition comprising a polyorganosiloxane having a vinyl group as a functional group and at least one photosensitizer selected from the group consisting of 2-hydroxy-2-methyl-1-phenyl-propane-1-one, 1-[4-(2-hydroxyethoxy)phenyl]-2-hydroxy-2-methylpropane-1-one, 1-hydroxycyclohexyphenyl ketone, benzyldimethyl acetal and benzyldiethyl acetal, followed by a treatment with ultraviolet ray irradiation.

2. The releasing sheet according to claim 1, wherein the addition curable silicone composition comprises 0.01 to 10 parts by weight of the photosensitizer based on 100 parts by weight of the total amount of an addition curable silicone and a crosslinking agent.

3. The releasing sheet according to claim 1, wherein the addition curable silicone composition comprises polydimethylsiloxane having a vinyl group as a functional group.

4. A process for the production of a releasing sheet as defined in claim 1, which comprises the steps of equipping a sheet substrate with a layer of an addition curable silicone composition comprising a polyorganosiloxane having a vinyl group as a functional group and at least one photosensitizer selected from the group consisting of 2-hydroxy-2-methyl-1-phenyl-propane-1-one, 1-[4-(2-hydroxyethoxy)phenyl]-2-hydroxy-2-methylpropane-1-one, 1-hydroxycyclohexyphenyl ketone, benzyldimethyl acetal and benzyldiethyl acetal, heat-treating the substrate equipped with said layer, and irradiating the heat-treated substrate equipped with said layer with ultraviolet ray irradiation to cure the layer of the addition curable silicone composition.

* * * * *